United States Patent Office 2,964,494
Patented Dec. 13, 1960

2,964,494

POLY-α-OLEFIN COMPOSITION CONTAINING N-METHYL-4'-HYDROXYBENZANILIDE

Gerald R. Lappin and Wayne V. McConnell, Kingsport, Tenn., assignors to Eastman Kodak Company, Rochester, N.Y., a corporation of New Jersey No Drawing. Filed May 8, 1958, Ser. No. 733,848

6 Claims. (Cl. 260—45.9)

This invention relates to the stabilization of poly-α-olefin compositions, and more particularly, to the stabilization of poly-α-olefin compositions against deterioration resulting from exposure to sunlight or ultraviolet light.

Poly-α-olefins are subject to deterioration when exposed to ultraviolet light. A number of so-called ultraviolet inhibitors are known which are used to inhibit the deterioration or degradation of many plastic or resin materials. However, some of the most effective of these known ultraviolet inhibitors for such plastic materials as cellulose triacetate, polystyrene, polyvinyl chloride and the like are not compatible with such poly-α-olefins as polyethylene. Typical of such ultraviolet inhibitors are 2,4 - dihydroxybenzophenone and 2,2',4,4'-tetrahydroxybenzophenone. Also, there are other common ultraviolet inhibitors that are compatible with, but are not entirely satisfactory or only mediocre stabilizers for, poly-α-olefins. In addition, many effective stabilizers for halogen-containing polymers such as polyvinyl chloride, polyvinylidene chloride, and the like are not necessarily effective stabilizers in poly-α-olefins, as stabilizers in halogen-containing polymers function essentially as halide scavengers while stabilizers in poly-α-olefins do not serve this function. Hence, it is highly unpredictable as to whether a given stabilizer or ultraviolet inhibitor will be compatible with, and a good stabilizer for, poly-α-olefin compositions short of actually testing the material in poly-α-olefins.

It is an object of this invention to provide new poly-α-olefin compositions of high stability against deterioration resulting from exposure to sunlight or ultraviolet light.

It is a further object of this invention to stabilize poly-α-olefin compositions with a new stabilizer that does not discolor the polymer.

It is likewise an object of this invention to provide novel poly-α-olefin compositions containing a substituted 4'-hydroxybenzanilide ultraviolet inhibitor that will not exude therefrom.

It is also an object of this invention to provide novel polyethylene compositions containing an additive that is compatible with, and an effective ultraviolet inhibitor for, the polyethylene compositions.

Other objects of the invention will be apparent from the description and claims which follow.

The present invention comprises poly-α-olefin compositions of improved resistance to deterioration due to ultraviolet light having incorporated therein a stabilizing amount of N-methyl-4'-hydroxybenzanilide which has the following structural formula:

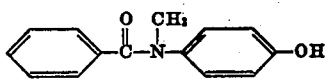

The ultraviolet inhibitor of the invention, N-methyl-4'-hydroxybenzanilide, can be readily prepared by reacting benzoylchloride with p-methylaminophenol, or a salt thereof, by the well-known Schotten-Baumann procedure to form N-methyl-4'-benzoyloxybenzanilide. The benzoyl ester linkage of this latter compound can be readily hydrolyzed by mild treatment with alkali to yield N-methyl-4'-hydroxybenzanilide. Recrystallization from a solvent, such as ethanol, can be employed to purify the stabilizer, although such a purification is not necessary for use in poly-α-olefins.

The subject ultraviolet inhibitor can be used to stabilize a wide variety of poly-α-olefin compositions against deterioration resulting from exposure to ultraviolet light. Any of the normally solid polymers of α-monoolefinic aliphatic hydrocarbons containing 2 to 10 carbon atoms can be stabilized in accordance with the invention. The subject stabilizer is preferably used in polyethylene and polypropylene, although such poly-α-olefins as poly-4-methylpentene-1, poly-3-methylbutene-1 and the like are included in the invention. Both the so-called "low density" and "high density" poly-α-olefin compositions can be stabilized in accordance with the invention. Reference is made to Fawcett et al., U.S. Patent No. 2,153,553, granted April 11, 1939, and to copending applications, Coover, U.S. Serial No. 559,536, filed January 17, 1956, and Coover et al., U.S. Serial No. 724,904, filed March 31, 1958, with regard to the prepartion of various types of poly-α-olefins. The subject stabilizer can be used as an ultraviolet inhibitor for the more common solid plastic poly-α-olefin compositions having average molecular weights of at least 15,000 and more usually at least 20,000, as well as the so-called poly-α-olefin waxes having lower molecular weights. The subject inhibitor is of particular utility in thin films or sheets of poly-α-olefin compositions about 0.5 to 100 mils in thickness.

The amount of N-methyl-4'-hydroxybenzanilide employed in poly-α-olefin compositions can be widely varied, the stabilizing amount usually varying with the particular use to which the poly-α-olefin composition is to be put. Concentrations of N-methyl-4'-hydroxybenzanilide of 0.1% to 10% are more generally used, with concentrations of 0.5% to 5% and often times 0.5% to 2.5% being preferably employed, the concentrations being based on the weight of the poly-α-olefin composition.

The ultraviolet inhibitor of the invention can be incorporated or blended into poly-α-olefin compositions by any of the conventional methods used for blending such materials into resins or plastics. Typical of such methods that can be suitably employed include milling on heated rolls, deposition from solvents and dry-blending.

The ultraviolet inhibitor of the present invention, N-methyl-4'-hydroxybenzanilide, lends to poly-α-olefin compositions improved stability, and more specifically, improved stability against deterioration resulting from exposure to sunlight or ultraviolet light. Also, the subject inhibitor does not impart objectionable discoloration to poly-α-olefin compositions. Thus, poly-α-olefin compositions stabilized in accordance with the invention can be utilized for a wide diversity of applications. The stabilizer of the invention, apart from being an effective stabilizer against deterioration resulting from exposure to ultraviolet light, has unexpected compatibility with poly-α-olefin compositions. While the subject N-methyl-4'-hydroxybenzanilide has good compatibility with polyethylene compositions, for example, the closely-related compound 4'-hydroxybenzanilide is not compatible with polyethylene compositions and exudes from polyethylene after being compounded therein.

The effectiveness of N-methyl-4'-hydroxybenzanilide as a stabilizer against photodegradation or ultraviolet light deterioration in poly-α-olefins is illustrated by the following examples.

EXAMPLE 1

A polyethylene sample containing 1% by weight of N-methyl-4'-hydroxybenzanilide of the invention, as well as polyethylene samples containing no additive, 1% by weight of 4'-hydroxybenzanilide and 1% by weight of N-butyl-4'-hydroxybenzanilide for comparative purposes were subjected to an outdoor weathering test. The various additives were incorporated into polyethylene having an average molecular weight of about 27,600 and a density of 0.919 by milling on heated rollers in accordance with usual practice. Thereafter, the polyethylene was compression molded into sheets about 60 mils in thickness. Samples of the resulting sheets containing the various additives and the control sample containing no additive were exposed to outdoor weathering on a rack facing south at an angle with the horizontal of 36.5° at Kingsport, Tennessee. The carbonyl content of the various samples was determined before exposure and after 14 months of exposure by measurement of the infrared absorption in the 5.82μ region. An arbitrary carbonyl unit was given to the carbonyl increase for comparative purposes. The determination of the carbonyl increase in the polymer gives an early and reliable indication of the breaking down of the polymer. Reference is made to the following two references concerning the determination of the carbonyl content by infrared measurement: Rugg, Smith and Bacon, J. Polymer Sci., 13, 535 (1954), and Cross, Richards and Willis, Discussions Faraday Soc., No. 9, 235 (1950). The carbonyl increases in the samples tested are set out in Table 1 below. The samples were also observed for possible change of color and exudation of the additive after the 14 months of weathering, such observations likewise being set out in Table 1 below.

Table 1

| Additive | Carbonyl Formation | Color | Exudation |
|---|---|---|---|
| None | 27.6 | White | None. |
| N-Butyl-4'-hydroxybenzanilide | 20.0 | do | Do. |
| 4'-Hydroxybenzanilide | 17.4 | Brown | Much. |
| N-Methyl-4'-hydroxybenzanilide [1] | 8.0 | White | None. |

[1] The stabilizer of the invention.

As can be observed from the data set out in Table 1, N-methyl-4'-hydroxybenzanilide is an effective inhibitor against ultraviolet deterioration, does not cause discoloration and has good compatibility in polyethylene, all of these properties not being possessed by such closely-related materials as N-butyl-4'-hydroxybenzanilide and 4'-hydroxybenzanilide. N-methyl-4'-hydroxybenzanilide is also compatible with, and an effective ultraviolet inhibitor for, polypropylene having a melt index of 0.08 and an inherent viscosity of 2.77 in 60 mil sheets at a 1% by weight concentration.

EXAMPLE 2

Into polyethylene having an average molecular weight of about 30,000 and a density of 0.945 was hot-roll-compounded 1% by weight of N-methyl-4'-hydroxybenzanilide. The resulting composition was compression molded into a film 5 mils thick and cut into 2½ by ½ inch samples. Similar polyethylene samples containing no additive were also prepared. The thus prepared samples were exposed to artificial weathering in an Atlas Twin-Arc weatherometer described in Anal. Chem. 25, 460 (1953), that was modified by the addition of 10 Westinghouse 20-watt fluorescent sunlamps. The samples were tested before and after 410 hours of exposure to the artificial weathering by elongation measurements on an Instron Tensile Tester at a rate of stretch of 2000% per minute. The samples were conditioned 3 days at 73° F. at a relative humidity of 50% before testing. The results of the test are set out in Table 2 below.

Table 2

Percent elongation retained after exposure of 410 hours

Additive:
  None _____ 12
  N-methyl-4'-hydroxybenzanilide _____ 50

As can be observed from the data in Table 2, N-methyl-4'-hydroxybenzanilide is an effective ultraviolet inhibitor for thin films of polyethylene. The N-methyl-4'-hydroxybenzanilide did not exude from the polyethylene sample or discolor the polyethylene during the course of the described weathering test.

EXAMPLE 3

Samples of polyethylene films 5 mils thick were prepared as described in Example 2, and thereafter subjected to artificial weathering as described in Example 2. Samples containing no additive and 1% by weight of N-methyl-4'-hydroxybenzanilide were tested for the length of exposure required for the onset of brittleness, and for the percent of original inherent viscosity retained after 235 hours of exposure. Brittleness is defined as having developed when the film broke on a single crease, the exposed surface being on the outside of the crease. Inherent viscosity ($\eta_i$) was determined on tetralin solutions of the films at 145° C., $\eta_i$ being defined as $$\eta_i = \frac{2.30 \log \eta_r}{C}$$

wherein C is the concentration of polyethylene in grams per 100 cc. of tetralin, and $\eta_r$ is the ratio of the viscosity of the solution to that of the tetralin. The results of the tests are summarized in Table 3 below.

Table 3

| Stabilizer | Hours of Exposure to Produce Brittleness | Percent Original Inherent Viscosity Retained After 235 Hours of Exposure |
|---|---|---|
| None | 100 | 25 |
| N-methyl-4'-hydroxybenzanilide | 280 | 55 |

The N-methyl-4'-hydroxybenzanilide ultraviolet inhibitor of the invention can be prepared by the method described in Example 4 below.

EXAMPLE 4

Eighty-six grams (0.25 mole) of p-methylaminophenol sulfate were added to a stirred suspension of 92.5 grams (1.10 moles) of sodium bicarbonate in 750 ml. of water. A 70.5 gram (0.50 mole) portion of benzoyl chloride was immediately added dropwise to the mixture over about a 30-minute period. Stirring was continued for an additional 30 minutes. The resulting N-methyl-4'-hydroxybenzanilide product was then filtered and washed with water. The yield of N-methyl-4'-hydroxybenzanilide was substantially quantitative, the reaction product (M.P. 166–8° C.) was of sufficient purity for use directly as an ultraviolet inhibitor in poly-α-olefins such as polyethylene, polypropylene and the like as described above.

Thus, the present invention provides new poly-α-olefin compositions, and more particularly, poly-α-olefin compositions having improved stability against deterioration resulting from exposure to ultraviolet light and weathering. The N-methyl-4'-hydroxybenzanilide stabilizer employed in the novel poly-α-olefin compositions of the invention was found not only to be an effective stabilizer but also to be compatible with, and not to discolor, the poly-α-olefin composition, such properties not being possessed by many compounds closely related to the stabilizer of the invention as demonstrated in Example 1 above.

Although the invention has been described in detail with reference to certain preferred embodiments thereof, it will be understood that variations and modifications can be effected within the spirit and scope of the invention as described hereinabove and as defined in the appended claims.

We claim:

1. A normally solid poly-α-olefin composition selected from the group consisting of polyethylene and polypropylene containing dispersed therein 0.1 to 10% by weight of N-methyl-4'-hydroxybenzanilide as an agent to inhibit deterioration of said poly-α-olefin composition by ultraviolet light.

2. A normally solid polyethylene composition containing dispersed therein 0.1% to 10% by weight of N-methyl-4'-hydroxybenzanilide as an agent to inhibit deterioration of said polyethylene composition by ultraviolet light.

3. A normally solid polyethylene composition containing dispersed therein 0.5% to 5% by weight of N-methyl-4'-hydroxybenzanilide as an agent to inhibit deterioration of said polyethylene composition by ultraviolet light.

4. A normally solid polyethylene composition containing dispersed therein about 1% by weight of N-methyl-4'-hydroxybenzanilide as an agent to inhibit deterioration of said polyethylene composition by ultraviolet light.

5. A normally solid polyethylene composition in a film 0.5 to 100 mils in thickness containing dispersed therein 0.5% to 2.5% by weight of N-methyl-4'-hydroxybenzanilide as an agent to inhibit deterioration of said polyethylene composition by ultraviolet light.

6. A normally solid polypropylene composition containing dispersed therein 0.1% to 10% by weight of N-methyl-4'-hydroxybenzanilide as an agent to inhibit deterioration of said polypropylene composition by ultraviolet light.

References Cited in the file of this patent

UNITED STATES PATENTS

| | | |
|---|---|---|
| 2,654,722 | Young et al. | Oct. 6, 1953 |
| 2,879,823 | Smith | Mar. 31, 1959 |